United States Patent [19]

Lenken

[11] 4,081,999
[45] Apr. 4, 1978

[54] TEMPERATURE INDICATOR WITH LIMIT DETECTION APPARATUS

[75] Inventor: Thomas J. Lenken, Milwaukee, Wis.

[73] Assignee: Desco Corporation, Milwaukee, Wis.

[21] Appl. No.: 744,959

[22] Filed: Nov. 26, 1976

[51] Int. Cl.² .................... G01K 3/00; G01K 5/62
[52] U.S. Cl. ........................ 73/343 R; 73/363.9; 116/129 B
[58] Field of Search ............ 73/343 R, 363.7, 363.9, 73/396, 417, 491; 116/129 B, 129 F, 129 N

[56] References Cited

U.S. PATENT DOCUMENTS

| 397,548 | 2/1889 | Hoffman | 73/343 R X |
| 1,606,936 | 11/1926 | Hapgood | 116/129 B |
| 2,365,962 | 12/1944 | Kahn | 73/396 |
| 2,605,736 | 8/1952 | Cook et al. | 73/363.7 X |
| 3,901,217 | 8/1975 | Clark | 73/396 X |

Primary Examiner—Richard C. Queisser
Assistant Examiner—John S. Appleman
Attorney, Agent, or Firm—Andrus, Sceales, Starke & Sawall

[57] ABSTRACT

A thermometer having temperature limit indication includes a support plate having a bimetal coil secured to the plate by a suitable hub. A pointer arm is extended from the bimetal coil and positioned across a temperature scale on the plate in accordance with the sensed temperature. A portion of the plate is bent outwardly to define an inclined plane member at a selected temperature limit and in the path of the pointer arm. The coil mounted pointer has sufficient resiliency to permit movement over the inclined plane while insuring latching behind such bent outwardly portion if at the temperature limit. A plurality of spaced bent outwardly members may be provided to indicate various limits.

The inclined plane member may be a separate adjustable element to permit adjustment of the temperature limit position.

13 Claims, 6 Drawing Figures

TEMPERATURE INDICATOR WITH LIMIT DETECTION APPARATUS

BACKGROUND OF THE INVENTION

This invention relates to a temperature indicator having a temperature limit detection apparatus forming an integral part thereof.

In many applications, it is important to know when an extreme high or low temperature condition has been created. Various temperature indicators have been suggested to record creation of selected temperature conditions. The prior art generally includes various one-way coupling units interconnecting a rotating indicator to a temperature responsive drive such as a bimetal coil. The pointer or similar element is retained in the position for the most extreme temperature condition sensed. Other systems have suggested mechanical interconnecting latch devices. For example, the U.S. Pat. No. 3,813,942 discloses mechanical holding of a pointer in position which is released in response by an auxiliary pumping control. Although such devices provide a satisfactory means for detecting temperature limit conditions, they are quite complex and costly. In many applications, a very simple, reliable thermometer with a limit control is desired. For example, freezers, refrigerators and other cold storage units should be maintained at a minimum temperature condition. If the temperature rises above a certain temperature, care is required in the use of the food products and if a given higher temperature is created, spoilage should be assumed. A thermometer with a limit indicator would provide the freezer user with accurate information as to the temperature conditions and thereby alert the user to any possibly dangerous conditions. Temporary power failures in the absence of a freezer owner particularly may cause undetected spoilage of food in the freezer. Thus, the owner may never realize the freezer has been off; or, if known, if the freezer temperature rose to a dangerous level. For such wide application, however, a simple and inexpensive indicating device which is not affected by icing and similar frost conditions encountered in the environment is required.

SUMMARY OF THE PRESENT INVENTION

The present invention is particularly directed to a temperature indicating device having a latching mechanism integrated into the thermometer support for latching of a temperature position indicating element in a temperature limit position. Generally, in accordance with a preferred and unique embodiment of the present invention, at least one inclined plane member is secured to a temperature support in the path of a moving indicating element as it moves to a selected limit temperature. The element and plane member are constructed with sufficient resiliency to allow movement of the element past the inclined plane member which then automatically moves behind the inclined plane member to prevent return of the element if the temperature moves in the opposite direction. A control member may be located beyond the inclined plane and the action incorporated into any suitable control function. The inclined plane member may also be mounted for adjustable positioning in the path of the temperature responsive element to permit controlled setting of the limit response temperature.

In a simple, inexpensive and unique embodiment of the present invention which is particularly adapted to use in a domestic freezer and the like, the support is a simple stamped plate member. A bimetal coil is secured to the plate member by a suitable hub assembly. A pointer arm is formed as an extension or separately secured to the bimetal coil and positioned across the face of the plate member in accordance with the sensed temperature. A portion of the plate is bent outwardly to define an inclined plane member in the path of the pointer arm. The coil mounted pointer has sufficient resiliency to permit convenient and unobstructed movement over the inclined plane while insuring latching behind such bent outwardly portion of the movement is in the opposite direction. This provides a very simple and inexpensive self-latching system for indicating desired temperature limit conditions. The pointer arm may also be formed of a lightweight material to readily flex and move over the member to a latched position. As applied to self-indicating and locking food container thermometers, a pair of spaced locking members may be provided. The initial limit constitutes an initial thawing condition indicating whether or not the temperature has risen above the thawing temperature. The second limit constitutes the higher temperature indicating that not only has it moved into the thawing ranges, but has moved above a temperature which would indicate that the danger of spoilage is sufficiently great to warrant even further precaution if not destruction of the food. For example, the first indicator or first locking plane may be set at approximately 32°, namely, the normal freezing temperature. Even though the temperature does so rise, the temperature condition would have to be created for a long period of time before any real damage would occur. However, if, for example, the temperature should rise within the container above 50°; the danger of food spoilage is so great that extra precaution, if not destruction, should be considered.

In more sophisticated systems, obviously, the inclined plane elements could be suitably mounted in an adjustable manner to permit adjustment of the temperature position, either to respond to increasing or decreasing temperatures depending upon the desired limit conditions.

BRIEF DESCRIPTION OF THE DRAWING

The drawing furnished herewith illustrates a preferred construction of the present invention in which the above advantages and features are clearly disclosed as well as others which will be readily understood from the following description.

In the drawing.

DESCRIPTION OF THE ILLUSTRATED EMBODIMENT

Figure 1:
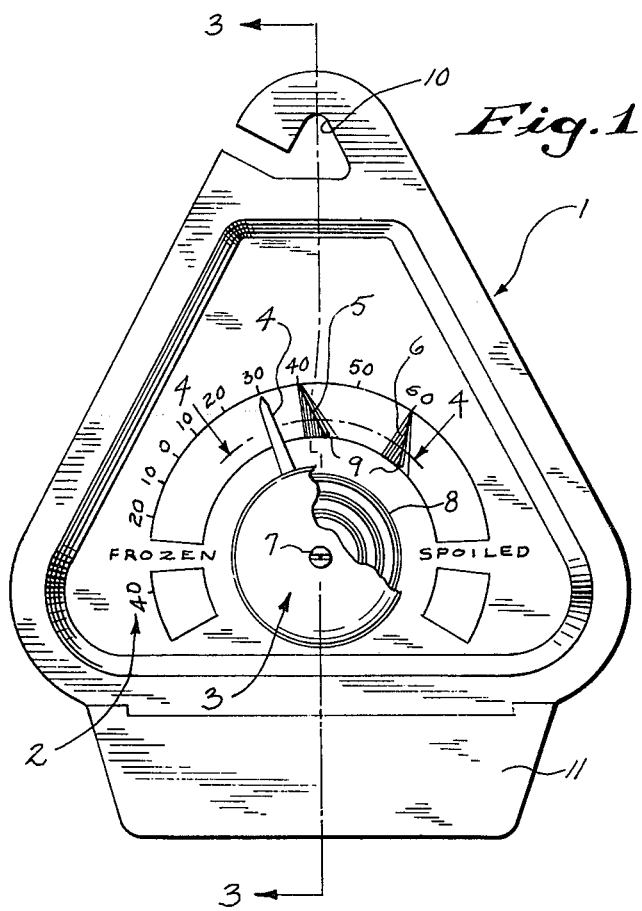
FIG. 1 is a front elevational view of the thermometer constructed in accordance with the invention.
Figure 3:
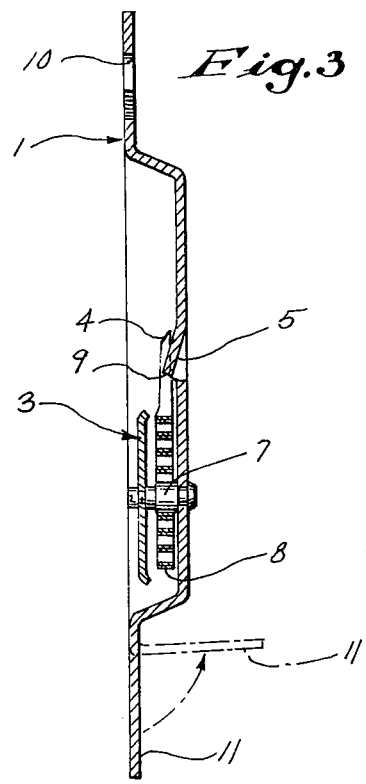
FIG. 3, with parts broken away and sectioned, is an enlarged vertical section taken generally on line 2—2 of FIG. 1.
Figure 2:
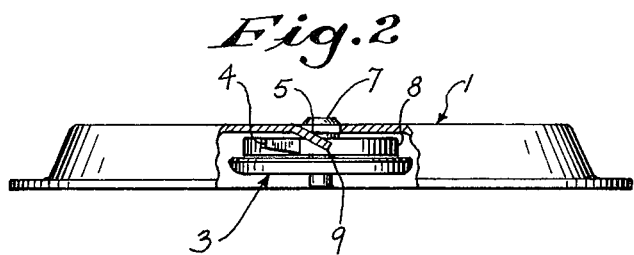
FIG. 2 is a top view of the thermometer unit shown in FIG. 1.
Figure 4:
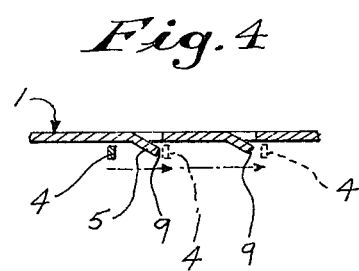
FIG. 4 is a fragmentary section taken generally on line 4—4 of FIG. 1.

Referring to the drawing and particularly to FIG. 1, a temperature indicator constructed in accordance with the present invention is shown including a support plate 1 with a temperature scale 2 imprinted thereon. A bimetal coil assembly 3 is secured to the plate 1 and includes a pointer 4. The coil assembly 3 expands and contracts with temperature to move the pointer 4 in accordance with the sensed temperature. The scale 2 is suitably calibrated so that each division corresponds to the predetermined temperature change; for example, 1°. In accordance with the present invention, a latching means 5 in the form of an inclined plane member is secured to the plate 1 and is located in the path of the pointer 4. If the temperature rises sufficiently, pointer 4 moves over the inclined plane member 5 and drops behind the inclined plane member 5, which prevents return movement with decreasing temperature. When the temperature is again below the lowest temperature limit position, the pointer 4 may be manually reset. In the illustrated embodiment of the invention, a second inclined plane member 6 is illustrated in spaced relation to the first to permit corresponding limit detection. The indicator is, for example, adapted to monitor the temperature conditions of a domestic or home freezer and is particularly useful in detecting conditions when temporary power failures occur in the absence of the user. The limit indicator records any high temperature status even though power is restored before the owner returns, and thereby may indicate any damaging temperature conditions in a freezer which may occur during the power failure. For this application, the first inclined plane member is located at approximately 32°, while the second is located at 50°. By employment of the spaced latching plane members, the abnormal temperature limit condition is recorded for indication to the users the next time they enter the freezer.

More particularly, the coil assembly 3 is illustrated with a relatively well-known construction including a supporting hub staked to the support plate 1. A bimetal coil 8 includes two strips of dissimilar metals which are intimately connected to each other. The metals have different coefficients of thermal expansion, and therefore, undergo different expansion and contraction with heating and cooling. This changes the curvature of the coil with the temperature in accordance with well-known construction. The outer end of the coil extends outwardly, and is secured to or forms the pointer 4 extending generally radially outwardly of the hub 7. The inner end of the coil 8 is firmly affixed to the hub 7 and, consequently, the expansion and contraction of the coil 8 causes the pointer 4 to rotate over the support plate 1 and, in particular, the scale 3.

The inclined plane members 5 and 6 are similarly formed as simple bent outwardly portions in the sheet metal support plate 1. The bent outwardly portions, as illustrated, are secured to the plate along the leading edge of the path of pointer 4 and are bent outwardly from such edge to define an inclined plane. The pointer and coil construction permits the lateral deflection of the pointer 4 as it moves onto and over the inclined plane member 5 or 6. The coil construction also results in a slight tensioning of the pointer 4 such that as it moves over the outermost edge 9 of the inclined plane member it drops down into the normal path and thus behind the bent outwardly portion. If the temperature now decreases, the pointer 4 merely moves backwardly into the inclined plane member which positively prevents further return movement. The illustrated thermometer plate is triangular shaped with a top hook 10 and a bendable bottom foot 11 for corresponding placement of the thermometer in a freezer or other environment. If the normal temperature is above a selected temperature and a lower temperature is to be detected, a similar inclined plane member could, of course, be located in the path of a pointer.

Figure 5:
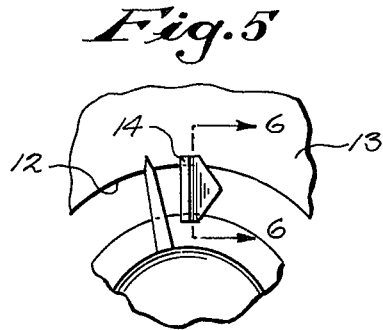
FIG. 5 is a simplified fragmentary illustration of an adjustable latching unit.
Figure 6:
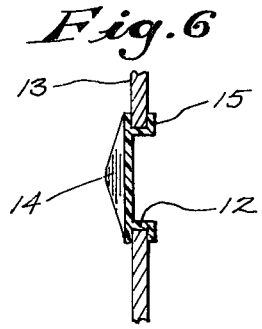
FIG. 6 is a view taken on line 6—6 of FIG. 5.

Although the previous embodiment of the invention provides a highly simple and inexpensive structure, it may be desirable in certain applications to permit adjustment or selection of the setting of the limit control. This, of course, can be provided by forming of the plate with a sufficiently workable material to allow the user to offset and form his own outward inclined plane projection. Alternately, the inclined plane member may be mounted for movement over the scale position. For example, as shown in FIGS. 5 and 6, an arcuate cut-out or slot 12 is formed in a support plate 13. An inclined plane element 14 includes a channel base 15 mounted on the edges of slot 12 for adjustment of the limit position. A sufficiently close friction fit can be provided such that the friction force is sufficient to hold the pointer against the forces created by the bimetal assembly. The inclined plane latching wall means secured to the support unit for the moving indicator element is a particularly practical and economically feasible embodiment. Within the broadest aspect of the invention, other latching means might of course be employed such as a spring loaded element in the path of the element, or even a flux field means such as magnetic, electric or fluid field means located and operable to appropriately lock the moving element in or above the limit state. All such systems require additional components and structure and do not provide the simplicity, reliability, and minimal cost provided by the inclined plane latch, particularly as disclosed in the preferred embodiment. Various modes of carrying out the invention are contemplated as being within the scope of the following claims, particularly pointing out and distinctly claiming the subject matter which is regarded as the invention.

I claim:

1. A temperature limit indicating apparatus, comprising a temperature sensitive assembly including a moveable indicator element, a support unit for said assembly including a member aligned with and laterally spaced from the path of said moveable element, said assembly including means supporting said moveable indicator element for lateral movement with respect to said member, and an inclined latching wall means secured to the member and projecting outwardly into the path of said element and forming an offset latching means preventing reverse movement of the indicator element.

2. The temperature limit indicating apparatus of claim 1 wherein said latching wall means is adjustably secured to the member.

3. The apparatus of claim 1 including a plurality of said latching wall means spaced along the path of said element.

4. The apparatus of claim 1 wherein said means supporting said element is a resilient means and said element includes an exposed portion for manually resetting the element from latching engagement with said latching wall means.

5. A temperature limit thermometer comprising a support plate having a calibrated scale thereon, temperature responsive means secured to the plate and moveable around an axis with changes in temperature, a pointer element extending from the temperature responsive means toward the scale, said pointer being resiliently interconnected to said temperature responsive means and for rotation about said axis and for movement toward and away from said plate, at least one inclined member secured to the plate in the path of said pointer element and allowing the pointer to engage and move over said inclined member and having a back latching wall to hold the pointer element from reverse movement past the inclined member.

6. The temperature limit thermometer of claim 5 wherein said inclined member is an integral struck-out portion of the plate having an integral edge in the path of said pointer element.

7. The thermometer of claim 6 including a plurality of said inclined members secured to said plate.

8. The thermometer of claim 7 wherein one member is set at substantially the 32° F indication of the scale and the second member is set at substantially the 50° F indication of the scale.

9. The thermometer of claim 5 wherein said plate includes a slot, and said inclined member includes a base portion mounted in said slot for selective positioning relative to said pointer element.

10. The thermometer of claim 5 wherein said temperature responsive means includes a bimetal coil having an outer free end, said pointer extending from said outer free end.

11. The thermometer of claim 5 wherein said support plate is formed of sheet metal, and said temperature responsive means includes a bimetal coil having a center support secured to the plate, said pointer extending from the outer end of the coil.

12. The temperature limit thermometer of claim 11 wherein said inclined plane member is an integral outwardly bent portion of the plate having an integral edge in the path of said pointer.

13. A temperature limit indicating apparatus, comprising a temperature sensitive assembly including a moveable indicator element, a support unit for said assembly including a member aligned with and laterally spaced from the path of said moveable element, an inclined latching wall means secured to the member and projecting outwardly into the path of said element and forming an offset latching means, at least one of said moveable indicator element and said wall means being constructed with a resilient support means permitting said indicator element to move past the wall means and said wall means preventing reverse movement of the moveable indicator element.

* * * * *

UNITED STATES PATENT OFFICE
CERTIFICATE OF CORRECTION

Patent No. 4,081,999            Dated April 4, 1978

Inventor(s) Thomas J. Lenken

It is certified that error appears in the above-identified patent and that said Letters Patent are hereby corrected as shown below:

Column 2,    Line 29,    after "32°" insert --- F ---;

Line 34,    after "50°" insert --- F ---;

Column 3,    Line 29,    after "32°" insert --- F ---;

Line 30,    after "50°" insert --- F ---;

Signed and Sealed this

Twenty-fourth Day of October 1978

[SEAL]

Attest:

RUTH C. MASON  
Attesting Officer

DONALD W. BANNER  
Commissioner of Patents and Trademarks